United States Patent [19]

Yoshida

[11] Patent Number: 4,665,534

[45] Date of Patent: May 12, 1987

[54] METHOD OF AND APPARATUS FOR DETERMINING TIME ORIGIN OF TIMER FOR MODEM

[75] Inventor: Atsushi Yoshida, Tokyo, Japan

[73] Assignee: NEC Corporation, Tokyo, Japan

[21] Appl. No.: 726,711

[22] Filed: Apr. 24, 1985

[30] Foreign Application Priority Data

Apr. 25, 1984 [JP] Japan ................................. 59-81700

[51] Int. Cl.⁴ .............................................. H04J 1/14
[52] U.S. Cl. ..................................... 375/106; 375/10;
375/98; 370/76; 370/101
[58] Field of Search ................... 375/10, 13, 106, 112,
375/98; 370/13, 70, 76, 100, 101, 110.1, 111,
69.1; 340/825.15; 364/569; 328/129.1

[56] References Cited

U.S. PATENT DOCUMENTS 4,052,567 10/1977 MacKay .............................. 370/101
4,199,663 4/1980 Herzog .............................. 370/101
4,310,922 1/1982 Lichtenberger et al. ........... 370/101

*Primary Examiner*—Benedict V. Safourek
*Attorney, Agent, or Firm*—Schwartz, Jeffery, Schwaab, Mack, Blumenthal & Evans

[57] ABSTRACT

A method of and apparatus for determining a time origin of a timer for a modem which is adapted for training in a parallel channel transmission system. A transmitter during a first period of time in a training procedure transmits a channel signal to a receiver except for a signal in at least one channel, while the receiver during the first period of time activates an AGC to receive the channel signal, whereafter the transmitter during a second period of time transmits the channel signal without excluding any channel and the receiver sees presence/absence of received signal power in a specific channel in which the received signal power in the first and second periods has been adjusted to a predetermined value.

3 Claims, 3 Drawing Figures

METHOD OF AND APPARATUS FOR DETERMINING TIME ORIGIN OF TIMER FOR MODEM

BACKGROUND OF THE INVENTION

The present invention relates to a training procedure performed in a parallel channel transmission system prior to the transmission of message data and, more particulrly, to a method of and apparatus for determining a time origin (starting point) of a timer which is used in a modem.

Training in data transmission serves various functions at each of transmitting and receiver units: at a receiver unit, converging automatic gain controller (AGC), setting up phases of a carrier and a timing clock, and converging an automatic equalizer and, at a transmitting unit, sequentially transmitting signals formatted each in a special pattern for fulfilling such functions at the receive unit over a predetermined period of time. The receiver unit includes a timer for recognizing transition of the predetermined period of time, and the timer requires a definite and accurate time origin. Should the time origin fail to be set with accuracy, training would be disabled from establishing phases of the signals or from converging the automatic equalizer at the receiver unit, thereby preventing initiation of data transmission.

In a single channel transmission system, it has been customary to determine a time origin of a timer taking advantage of the fact that signals formatted in special patterns as described have different spectra in a single channel. Specifically, use is made of a filter for identifying a spectrum particular to a special pattern, so that a time origin of a timer can be determined by detecting transition of the spectrum. However, in a parallel channel transmission system such as disclosed in U.S. Pat. No. 4,300,229, the band assigned to each channel is so narrow that direct application of the above-described method results in the need for filters for spectrum discrimination the bands of which are far narrower than the transmission band. Such filters are not only difficult to design but also cause of an increase in costs.

SUMMARY OF THE INVENTION

It is therefore an object of the present invention to provide a method of and apparatus which eliminates the shortcomings discussed above and determines a time origin of a timer for a modem in a parallel channel transmission system.

It is another object of the present invention to provide a generally improved method of and apparatus for determining a time origin of a timer for a modem.

In accordance with one aspect of the present invention, there is provided a method of determining a time origin of a timer during training in which a transmitter transmits a signal in a special pattern to a receiver over a transmission path. The method comprises the steps of adjusting a gain of an automatic gain controller installed in the receiver in response to a first signal which appears in a first period of time and has at least one channel in which no signal exists and n channels (n being an integer larger than 1) in which signals exist, the first signal being transmitted from the transmitter to the receiver prior to the special pattern signal, detecting transition from the first period of time to a second period of time in response to a second signal which appears in the second period of time and has (n+1) channels in all of which signals exist, the second signal being transmitted from the transmitter to the receiver after the first period of time, and determining a time when the transition is detected as a time origin.

In accordance with another aspect of the present invention, there is provided an apparatus for determining a time origin of a timer during training in which a transmitter transmits a signal in a special pattern to a receiver over a transmission path. The apparatus comprises an automatic gain controller a gain of which is adjusted in response to a first signal which appears in a first period of time and has at least one channel in which no signal exists and n channels (n being an integer larger than 1) in which signals exist. The first signal is transmitted from the transmitter to the receiver prior to the special pattern signal. A transition detector detects transition from the first period of time to a second period of time in response to a second signal which appears in the second period of time and has (n+1) channels in all of which signals exist. The second signal is transmitted from the transmitter to the receiver after the first period of time.

The above and other objects, features and advantages of the present invention will become apparent from the following detailed description taken with the accompanying drawings.

DESCRIPTION OF THE PREFERRED EMBODIMENT

While the method of and apparatus for determining a time origin of a timer for a modem of the present invention is susceptible to numerous physical embodiments, depending upon the environment and requirements of use, a substantial number of the herein shown and described embodiments have been made, tested and used, and all have performed in an eminently satisfactory manner.

The principle underlying the present invention will first be described.

Concerning a receiver unit or receiver in a transmission system, a possible approach for determining a time origin of a training procedure is to employ as the time origin a time when a training signal has been received for the first time after the duration of a condition wherein no signal is received. This approach is unsatisfactory, however, because the signal power arriving at a receiver is usually not constant and, hence, it is not sure for the receiver to accurately recognize the first transmission of a training signal from a transmitting unit, or transmitter. Granting it to be recognizable, a delay necessarily develops between the time of first transmission of a training signal from the transmitter and the time of recognition thereof at the receiver and, moreover, the amount of delay usually depends upon the received signal power.

In accordance with the present invention, a training procedure includes a first and a second discrete periods of time. During the first period of time, a transmitter transmits to a receiver a frequency-multiplex signal in which no signal exists in at least one channel and sinusoidal waves exist in n channels. The frequency-multiplex signal, upon arrival at the receiver, activates an AGC which functions to maintain received signal power in all the channels constant, thereby adjusting the receiver to predetermined sensitivity. Such first period of time is selected with sufficient margins considering uncertain buildup and delay of operation of the AGC as well as convergence time. During the second period of time which follows the first, the transmitter sends a signal in which sinusoidal waves exist in all the channels. Then, the receiver detects received signal power in the specific channel in which a signal did not exist in the first period of time but did in the second period of time, thereby recognizing the timing of transition from the first period of time to the second. In this instance, since the received signal power in the specific channel has already been adjusted to a predetermined value as previously stated, it can be surely detected at a predetermined delay. This time point of detection provides a time origin for the rest of the training procedure.

Figure 1:
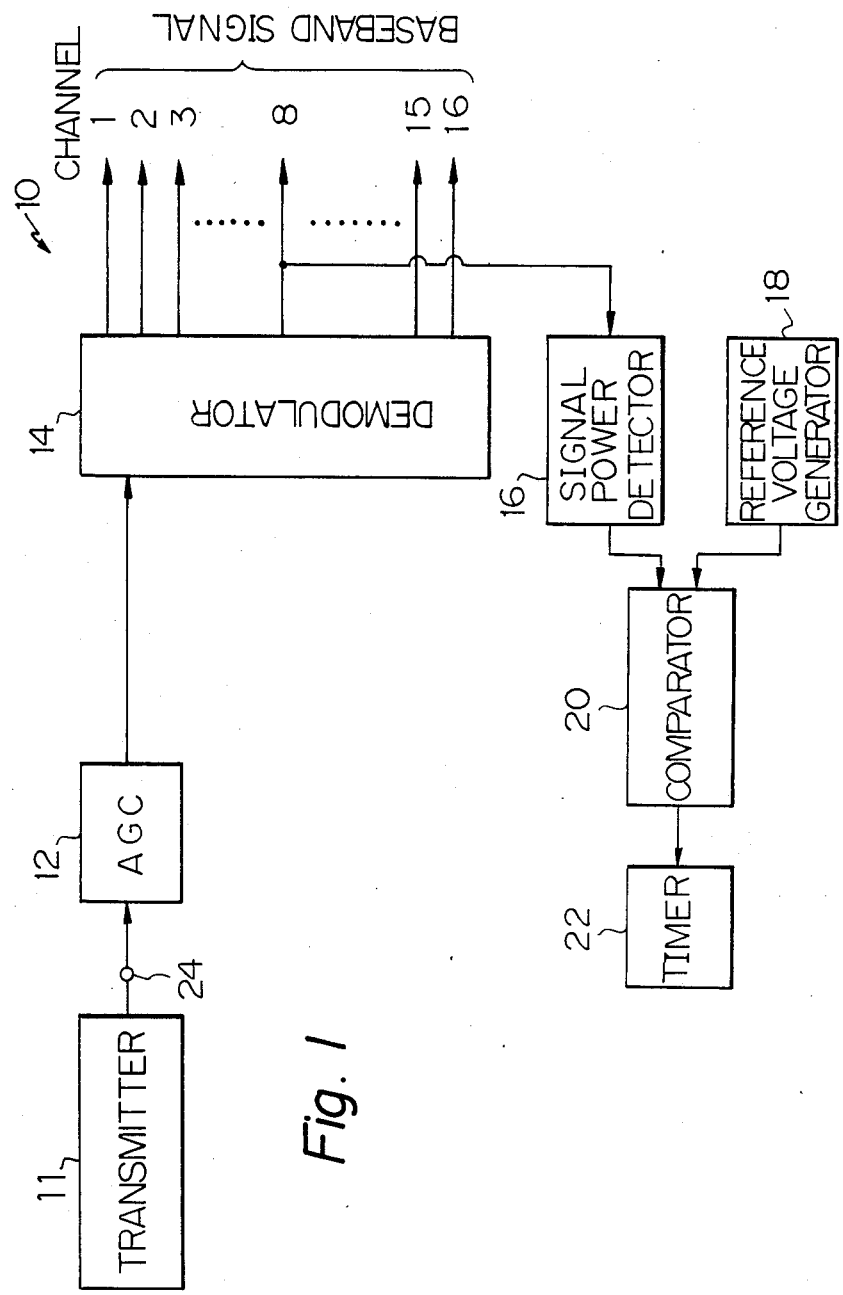
FIG. 1 is a block diagram of a circuit arrangement in accordance with a preferred embodiment of the present invention.

Referring to FIG. 1, a specific construction in accordance with the present invention is shown which is applied to a receiver 10 of a 16-channel band-division data modem. In the drawing, an AGC 12 and a demodulator 14 in combination constitute a part of a receiving side of the 16-channel band-division data modem. A power detector 16, a reference voltage generator 18, a comparator 20 and a timer 22 are the elements which are added to the receiver 10 for practicing the present invention. The demodulator 14 may be implemented by, for example, the construction shown in FIG. 16 of previously mentioned U.S. Pat. No. 4,300,229. The power detector 16 is adapted to detect power of a demodulated complex baseband signal and constructed to detect it in terms of a sum of a square of a real part of a complex baseband signal and a square of an imaginary part of the same. The detected power is compared with a reference voltage by the comparator 20.

Figures 2A, 2B:
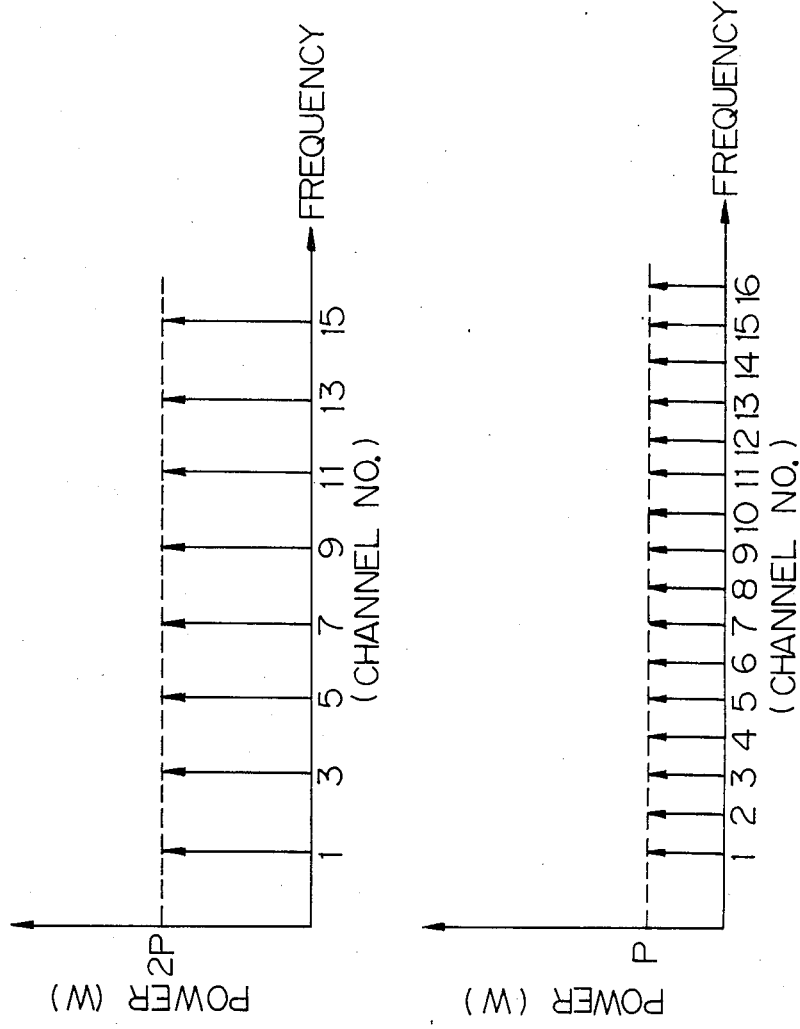
FIGS. 2A and 2B are spectrum charts representative of the operation of the circuit shown in FIG. 1.

Referring to FIGS. 2A and 2B, there are shown specific examples of a spectrum of signals which are transmitted from a transmitter 11 to the receiver 10 of FIG. 1 over a transmission path in order to practice the present invention. As shown, an initial part of the training procedure is divided into a first segment 1 shown in FIG. 2A and a second segment 2 shown in FIG. 2B. In the segment 1, among sixteen channels in total, the first, third, fifth, seventh, ninth, eleventh, thirteenth and fifteenth channels are each transmitted with power of 2P watts, the other channels being not transmitted. Thereafter, in the segment 2, all the channels from the first to the sixteenth are transmitted with power of P watts. That is, the sum of the power signals assigned to all the channels is 16P watts in both the segment 1 and the segment 2.

Referring again to FIG. 1, the AGC 12 is adjusted such that the sum of power in all the channels of a signal coming in through a received input terminal 24 remains constant. The output of the AGC 12 is applied to the demodulator 14 which then separates a baseband signal channel by channel. FIrst, when the signal in the segment 1 of the training procedure has been received, the eighth-channel received signal power, among the outputs of the demodulator 14, is zero. Then, upon receipt of the signal in the segment 2, the power detector 16 detects the received signal power in the eighth channel. The output of the power detector 16 is compared with an output of the reference voltage generator 18 by the comparator 20. The output of the comparator 20 is routed to the timer 22 to activate it with the result that a start-of-timing pulse is generated.

In summary, it will be seen that the present invention provides a method of and apparatus for determining a time origin of a timer for a modem which eliminates the need for a filter otherwise required for the discrimination of a spectrum, and positively and easily determines a time origin of a training procedure making the most of a channel separating function particular to a parallel channel transmission system, thereby making the result of training far more reliable than in the prior art. These advantages are derived from the unique system of the present invention wherein a transmitter during a first period of time in a training procedure transmits a channel signal to a receiver except for at least one channel, while the receiver during the first period of time activates an AGC thereof to receive the channel signal, whereafter the transmitter during a second period of time transmits the channel signal excluding no channel and the receiver sees presence/absence of received signal power in a specific channel in which the received signal power in the first and second periods has been adjusted to a predetermined value.

Various modifications will become possible for those skilled in the art after receiving the teachings of the present disclosure without departing from the scope thereof.

What is claimed is:

1. A method of starting a timer during training in which a transmitter transmits a signal in a special pattern to a receiver over a transmission path, said method comprising the steps of:
    (a) adjusting a gain of an automatic gain controller installed in the receiver in response to a first signal which appears in a first period of time and has at least one channel in which no signal exists and n channels (n being an integer larger than 1) in which signals exist, the first signal being transmitted from the transmitter to the receiver prior to the special pattern signal;
    (b) detecting transition from the first period of time to a second period of time in response to a second signal which appears in the second period of time and has (n+1) channels in all of which signals exist, the second signal being transmitted from the transmitter to the receiver after the first period of time; and
    (c) starting a timer in response to the transition detected as defined in step (b).

2. An apparatus for starting a timer during training in which a transmitter transmits a signal in a special pattern to a receiver over a transmission path, said apparatus comprising:
    automatic gain control means a gain of which is adjusted in response to a first signal which appears in a first period of time and has at least one channel in which no signal exists and n channels (n being an integer larger than 1) in which signals exist, the first signal being transmitted from the transmitter to the receiver prior to the special pattern signal; and
    transition detector means for detecting transition from the first period of time to a second period of time in response to a second signal which appears in the second period of time and has (n+1) channels in all of which signals exist, the second signal being transmitted from the transmitter to the receiver after the first period of time, and a timer started in response to the detected transition.

3. An apparatus as claimed in claim 2, wherein said transition detector means comprises a demodulator, signal power detector means for detecting power of a signal which appears in a predetermined channel of said demodulator, reference voltage generator means for generating a reference voltage, and comparator for comparing an output of the signal power detector means with the reference voltage.

* * * * *